United States Patent Office 3,753,951
Patented Aug. 21, 1973

3,753,951
METHOD FOR PRODUCING ALTERNATIVE COPOLYMERS CONTAINING LITTLE GEL OF A CONJUGATED VINYL COMPOUND AND A CONJUGATED DIENE
Mitnji Miyoshi, Kanagawa, and Kazuo Matsuura, Kawasaki, Japan, assignors to Nippon Oil Company, Limited, Tokyo, Japan
Filed Mar. 11, 1970, Ser. No. 18,591
Claims priority, application Japan, Mar. 12, 1969, 44/18,362; May 12, 1969, 44/35,706
Int. Cl. C08f 15/00, 15/02
U.S. Cl. 260—63 BB    5 Claims

ABSTRACT OF THE DISCLOSURE

Method for producing copolymers of a conjugated diene substituted or unsubstituted with halogens and a conjugated vinyl compound which comprises contacting (A) a conjugated diene or a halogen-containing conjugated diene and (B) a conjugated vinyl compound having the general formula

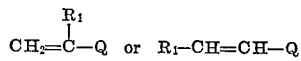

Figure 1:
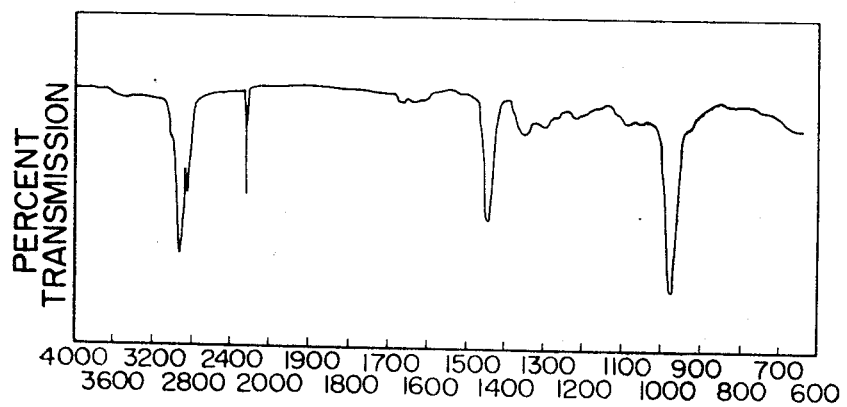

wherein $R_1$ is hydrogen, nonpolymerizable hydrocarbon or halogenated hydrocarbon radical containing from 1 to 20 carbon atoms, and Q is nitrile radical or the group

in which Y is a radical selected from the group consisting of ZH, ZR, ZMe, NR'R", halogens and hydrogen, Z being oxygen or sulfur atom, R being a hydrocarbon radical containing from 1 to 20 carbon atoms, R' and R" being the same or different hydrocarbon radicals containing up to six carbon atoms or morpholino, pyrolidino, or piperidino radicals and Me is an element belonging to Groups I–III of the Periodic Table of the elements indicated in terms of monovalency or ammonium radical in the presence of a catalytic quantity of an organic aluminium halogenide having the general formula $AlR_{3-n}X_n$ wherein $n$ is an arbitrary number of the value $1 \leq n < 3$, X is a halogen and R is an aliphatic hydrocarbon radical containing from 3 to 6 carbon atoms, a part of all of said radicals having a branch.

BACKGROUND OF THE INVENTION

(1) Field of the invention

This invention relates to a method for producing copolymers of a conjugated vinyl compound and a conjugated diene or a halogen-containing conjugated diene by contacting these monomers with an organic aluminium halogenide. Particularly it is concerned with a method for producing copolymers of a conjugated vinyl compound and a conjugated diene substituted or unsubstituted with halogens having a quite regularly alternative structure and containing little gel by the use of an organic aluminium compound containing branched alkyl groups.

(2) Description of the prior art

Copolymers of conjugated vinyl compounds and conjugated dienes substituted or unsubstituted with halogens are known including, for example, acrylonitrile-butadiene copolymers known as the nitrile rubber, acrylate- or methacrylate-butadiene copolymers, and acrylonitrile-chloroprene copolymers known as the trade name "Neoprene ILA," which are used in practice as rubbery macromolecular materials with excellent resistance to oils and chemicals. All of them are the amorphous, irregular rubbery random copolymers produced by means of radical emulsion polymerization.

It is also known that alternative copolymerization of monoolefine and a conjugated vinyl compound is effected by contacting a monoolefine such as propylene or styrene and a conjugated vinyl compound such as acrylonitrile or an acrylate with an organic aluminum compound.

However, when a conjugated vinyl compound and a conjugated diene or a halogen-containing conjugated diene such as butadiene or chloroprene are contacted with an organic aluminum halogenide such as, for example, ethyl-aluminium sesquichloride or ethylaluminium dichloride in accordance with the prior process, the yield of the resulting copolymer is too low to apply it to commercial use or the resulting polymer almost consists of a gelled product insoluble in ordinary organic solvents. Consequently, it was substantially impossible to make the production of useful macromolecular materials with the highly regular alternative structure as mentioned above commercially feasible.

We have already proposed a process for the preparation of acrylonitrile-butadiene copolymer with highly regular alternative structure which comprises using a binary catalyst composition comprising combination of an organic aluminum compound and a vanadium compound, a binary catalyst composition consisting of an organic aluminum halogenide and halogenide of a metal selected from the group consisting of magnesium, zinc, cadmium, boron, tin, cobalt and nickel, or a ternary catalyst consisting of an organic aluminum halogenide, a vanadium compound and a halogenide of a metal such as magnesium or zinc.

SUMMARY OF THE INVENTION

An object of this invention is the provision of a novel method for producing copolymers of a conjugated vinyl compound and a conjugated diene or a halogen-containing conjugated diene by a process entirely different from the process by radical emulsion polymerization.

Another object is to provide a method for producing the copolymers containing only a small amount of gel which is superior in molecular weight and yield to those produced by method using a binary or ternary catalyst as previously proposed by us. It is a further object of this invention to provide a method for very easily producing copolymers with very high degree of alternative copolymerization not only from acrylonitrile and butadiene but also from a wide variety of conjugated vinyl compounds and conjugated dienes or halogen-containing conjugated dienes.

We have discovered that in the copolymerization reactions using the binary and ternary catalysts as previously proposed the organic aluminium halogenide plays the major role in the catalytic activity. It is presumed, though being uncertain as to the mechanism, that the metallic compounds other than aluminium participate in inhibiting gelation of the polymer and maintaining the resulting copolymer in soluble state in solvents. We have further found that whereas, if the alkyl radical in the organic aluminium halogenide is a straight alkyl such as ethyl or n-propyl, the yield is extremely low, thus making the process commercially unfeasible, or the resulting polymer contains a large portion of insoluble gelled product, giving the polymer consisting of 100% gelled product with certain monomers, when an organic aluminium halogenide containing a branched alkyl radical such as isobutyl is used, the content of gelled product is very low and perfectly soluble copolymers are produced from most of the monomers. Moreover, we have found that this fact is generally applicable to any combination of the conjugated vinyl compound and conjugated diene with regularity, the desired effect can be produced even with a mixture of the organic aluminium halogenide containing a straight alkyl group and one containing a branched alkyl group and that the copolymerization reaction may be effected over a wide range of polymerization conditions. The compounds react with the halide to produce a catalyst thereof represented by the formula $AlR_{3-n}X_n$ wherein R, γ and n are as defined below.

This invention is based upon the universal principle derived from the aforementioned findings. Thus the invention is directed to a method for producing copolymers of a conjugated diene or a halogen-containing conjugated diene and a conjugated vinyl compound with a high degree of alternative copolymerization which comprises contacting (A) a conjugated diene or a halogen-containing conjugated diene (hereinbelow referred to as monomer of the group A) and (B) a conjugated vinyl compound having the general formula

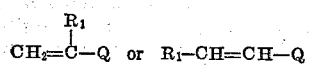

wherein $R_1$ is hydrogen, nonpolymerizable hydrocarbon radical containing 1–20 carbon atoms, halogen-containing non-polymerizable hydrocarbon radical containing 1–20 carbon atoms or a halogen, $R_1$ including a derivative group containing other inert substituents and Q is nitrile radical or the group

in which Y is a radical selected from the group consisting of ZH, ZR, ZMe, NR'R'', R, halogens and hydrogen, Z being oxygen or sulfur atom, R being a general organic radical containing 1–20 carbon atoms, R' and R'' being the same or different radicals selected from general organic radicals, including case where R' and R'' are combined at a site other than that of nitrogen and Me being an element belonging to Groups I–III of the Periodic Table of the Elements indicated in terms of monovalency or ammonium radical (hereinbelow referred to as monomer of the group B) with an organic aluminium halogenide having the general formula $AlR_{3-n}X_n$ wherein $n$ is an arbitrary number of $1 \leq n < 3$, X is a halogen and R is an aliphatic hydrocarbon radical, a part or all of said radicals having a branch of 3–6 carbon atoms used as a catalyst.

As compared with the irregular copolymers according to the prior processes of radical emulsion polymerization, the copolymers produced by the method according to this invention have entirely new characteristics.

More specifically, the acrylonitrile-butadiene copolymer obtained according to the process of the present invention has a high regular alternative structure and, as a result, it has characteristic features in that it has high tensile strength at breakage and elongation, though the modulus is low; it can be easily elongated but very difficultly broken; it has a high repulsive resilience and a low glass transition point; and it tends to be easily crystallized at the time of elongation, as compared with nitrile rubbers having an irregular structure. The copolymers produced by the method of this invention are macromolecular materials capable of being processed for a variety of uses and vulcanized to useful rubber products.

Figure 2:
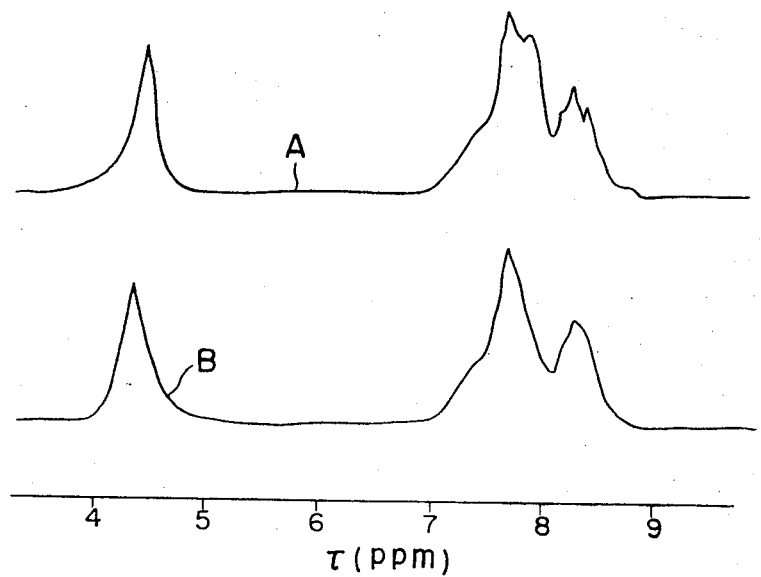

FIG. 1 shows the infrared absorption spectrum of the polymer produced in Example 1 below and the curves A and B in FIG. 2 are NMR spectra of the acrylonitrile-butadiene random copolymer produced by means of emulsion radical polymerization (acrylonitrile content, 48%) and the copolymer produced in Example 1 below respectively. It is apparent from these figures that the copolymers obtained by the method of this invention have a regular alternative structure.

According to the method of this invention the molecular weight and yield of the copolymers obtained are improved as compared with the methods using the binary or ternary catalysts as previously proposed by us, and because of one catalytic component involved complexities in procedure and difficulty in control can be avoided, which necessarily accompanied by the methods with the binary and ternary catalysts.

Application of the method of this invention is not limited to combination of acrylonitrile and butadiene but widely without any difficulty to combinations of the conjugated vinyl compounds as described above and the conjugated dienes substituted or unsubstituted with halogens. The method of this invention is advantageous in that it is easily feasible on industrial scale in a relatively short reaction time.

As the representative of the organic aluminium halogenides used in this invention may be mentioned isopropylaluminium dichloride,
isopropylaluminium dibromide,
diisopropylaluminium chloride,
diisopropylaluminium bromide,
isobutylaluminium dichloride,
isobutylaluminium dibromide,
diisobutylaluminium chloride,
diisobutylaluminium bromide,
sec-butylaluminium dichloride,
sec-butylaluminium dibromide,
di-sec-butylaluminium chloride,
di-sec-butylaluminium bromide,
isopentylaluminium dichloride,
isopentylaluminium dibromide,
diisopentylaluminium chloride,
diisopentylaluminium bromide,
isohexylaluminium dichloride,
isohexylaluminium dibromide,
diisohexylaluminium chloride,
diisohexylaluminium bromide and mixtures thereof. Additionally, a trialkylaluminium such as, for example, triisopropylaluminium, triisobutylaluminium, tri-sec-butylaluminium, triisopentylaluminium or triisohexylaluminium may be added to an aluminium halogenide such as, for example, aluminium trichloride or aluminium tribromide in such an amount to form the compound having the general formula $AlR_{3-n}X_n$ wherein $n$ is in the range of $1 \leq n < 3$ and, if necessary, slightly heated before use. These treatments may be made simply in accordance with knowledge on the prior organic aluminium halogenides. As set forth above, the desired effect is produced even if a portion of the aforementioned organic aluminium compound containing a branched alkyl group is replaced by an organic aluminium chloride containing a straight alkyl group. In the latter case, selection may be arbitrarily made from a variety of organic aluminium halogenides, trialkylaluminiums and aluminium halogenides. As the representative of these may be mentioned methylaluminium dichloride, ethylaluminium dichloride, n-butylaluminium dichloride, methylaluminium dibromide, ethylaluminium dibromide, n-butylaluminium dibromide, ethylaluminium sesquichloride, ethylaluminium sesquibromide, diethylaluminium chloride, di-n-butylaluminium chloride, diethylaluminium bromide, trimethylaluminium, triethylaluminium, tri-n-butylaluminium, triphenylaluminium, trihexylaluminium, aluminium trichloride and aluminium tribromide.

Generally included are conjugated dienes and halogen-substituted conjugated dienes as the monomer of the group A used in this invention. Illustrative embodiments of these compounds are butadiene-1,3, 2-bromo-butadiene-1,3, 2-chloro-1-methyl-butadiene-1,3, chloroprene, 2,3-dichloro-butadiene-1,3, 2,3-dimethyl-butadiene-1,3, 2-ethyl-butadiene-1,3, 1-ethyl-2-chloro-butadiene-1,3, isoprene, 1,3-pentanediene, 1-phenyl-butadiene-1,3, 1,2,3-trichloro-butadiene-1,3.

The monomer of the group B generally includes conjugated vinyl compounds having the general formula

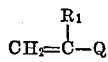

or $R_1CH=CH-Q$ wherein $R_1$ is hydrogen, non-polymerizable hydrocarbon radical containing 1–20 carbon atoms, halogen-containing non-polymerizable hydrocarbon radical containing 1–20 carbon atoms or a halogen, which may be a derivative group containing other inert substituents and Q is nitrile radical or the group

in which Y is a radical selected from the group consisting of ZH, ZR, ZMe, NR'R'', R, halogens and hydrogen, Z being oxygen or sulfur atom, R being a general organic radical containing 1–20 carbon atoms, R' and R'' being the same or different radicals selected from general organic radicals, including case where R' and R'' are combined at a site other than that of nitrogen and Me being the monovalent moiety of an element belonging to Groups I–III of the Periodic Table of the Elements or ammonium radical.

The $R_1$ includes, for example, hydrocarbon radicals such as alkyl, aryl, aralkyl, alkylaryl and cycloalkyl and those substituted with halogen or other inert groups. As the halogen are used chlorine, bromine, iodine and fluorine. As the R, R' and R'' are preferably general hydrocarbon radicals and their inert derivatives may be employed as well. For example, radicals such as alkyl, aryl, aralkyl, alkylaryl, cycloalkyl are mentioned. As the Y are mentioned halogens such as chlorine, bromine, iodine and fluorine. Me is an element belonging to the Groups I–III of the Periodic Table of the Elements indicated in terms of monovalency and as the element are mentioned lithium, sodium, potassium, calcium, strontium, magnesium, zinc, boron, aluminium and the like. "Indicated in terms of monovalency" as used herein means ½ with divalent elements and ⅓ with trivalent elements. Preferred are salts of elements of the Group I referred to above and ammonium salt. The case where R' and R'' are combined at a site other than that of nitrogen in NR'R'' includes, for example, morpholino, pyrrolidono and piperidino groups, as shown by the structures

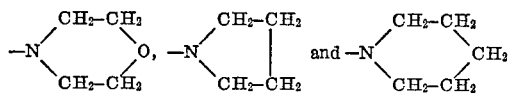

As a matter of fact, acrylonitriles, acrylates, acrylamides, acrylic halides, acrylic acid, acrylic acid salts, acrolein and vinyl ketones may be illustrated as the conjugated vinyl compounds. Practical examples of these compounds include acrylonitrile, methacrylonitrile, crotonitrile, α-ethylacrylonitrile, α-cyclohexylacrylonitrile, α-crotoacrylonitrile, α-chloromethylacrylonitrile, methyl acrylate, ethyl acrylate, butyl acrylate, phenyl acrylate, methyl methacrylate, ethyl methacrylate, butyl methacrylate, phenyl methacrylate, methyl crotonate, ethyl crotonate, butyl crotonate, phenyl crotonate, acrylamide, methacrylamide, crotoamide, N-ethylacrylamide, N-ethylmethacrylamide, N-ethylcrotonamide, acrylic chloride, acrylic bromide, methacrylic chloride, methacrylic bromide, crotonic chloride, crotonic bromide, acrylic acid, methacrylic acid, crotonic acid, sodium acrylate, sodium methacrylate, sodium crotonate, acrolein, methacrolein, crotonaldehyde, methyl vinyl ketone, ethyl vinyl ketone, butyl vinyl ketone, phenyl vinyl ketone and the like.

In carrying out the method of this invention the organic aluminium compound may be used at any ratio, but it is usually used at a ratio of 0.001–10 moles per mole of the monomer of the group B. For example, copolymers with very high degree of alternative copolymerization are obtained in high yield using tributylaluminium and aluminium trichloride respectively in an amount equimolar to the monomer of the group B. The use of catalytic components more than 1.5 moles per mole of the monomer of the group B will not produce so much advantageous results. Adversely, while the catalytic component may be used at a ratio less than that of the monomers of the group B, it is not desirable to use the former at an extremely low concentration, because the catalytic activity will be low below a certain degree of concentration. Usually, it is preferably used at a ratio of 0.01–0.5 mole per mole of the monomer of the group B. The catalytic component may be added to the polymerization system after preparing the mixture with an organic solvent which does not adversely affect the reaction such as aliphatic hydrocarbon, aromatic hydrocarbon, halogenated alkyl or halogenated aryl. Alternatively, a portion of the of the monomer of the group A or B may be added in the preparation of the catalyst, but generally the addition of the monomer of the group B will produce superior results. Further alternatively, the catalytic components may be successively added to the polymerization system.

As for the ratio of monomers used in the process of this invention, copolymers with very high degree of alternative copolymerization are obtained independent of the monomer composition. In some cases, however, rate of the polymer formation, yield, molecular weight and other properties will be affected by the ratio of mixing the monomers, which will be determined appropriately in accordance with the desired result. Although the use of an excess of the monomer of the group A tends to produce good results, a molar ratio of the monomer of the group A to the monomer of the group B between 0.2 and 20 may be usually used.

The polymerization temperature adaptable in this invention is from $-100°$ C. to $100°$ C. and preferably from $-50°$ C. to $50°$ C. More favorable results will be obtained when conducted at a temperature in the range between $-20°$ C. and $30°$ C.

The method of this invention can be carried out by block polymerization or solution polymerization. In the solution polymerization aliphatic hydrocarbon, aromatic hydrocarbon and halogenated hydrocarbon such as halogenated aryl can be used as the solvent for the polymerization. The copolymerization may be conducted either by batch process or by continuous process.

After completion of the polymerization reaction after treatment may be made by a conventional means such as treatment with an alcohol or treatment with an alcohol-hydrochloric acid. Then, there are isolated copolymers of a conjugated vinyl compound and a conjugated diene or a halogen-containing conjugated diene with very high degree of alternative copolymerization at substantially equimolar ratio as described above.

The copolymerization reaction of a conjugated vinyl compound with a conjugated diene or a halogen-containing conjugated diene by the use of an organic aluminum halogenide containing a branched alkyl group as described above is still unsatisfactory in some respects in the yield, rate of polymerization, activity of the catalyst and the like, for example, in that the rate of polymerization is so slow as forming a small amount of the polymer per unit of time and the amount of the catalyst employed is large. We have made the surprising discovery that by carrying out the above-mentioned copolymerization reaction in the presence of a compound selected from the group consisting of (a) water, (b) trihaloacetic acids or esters thereof, (c) organic peroxides, (d) organic azo compounds, (e) trialkyl borons and (f) metal acetylacetonates (hereinafter referred to as activator) the rate of polymerization is remarkably higher, the high yield is attained in a shorter period of time and the amount of catalyst employed is less than in the absence of the same. Moreover, the resulting copolymers are likewise characterized by being of a regular alternative copolymer and containing a little gel. On the contrary, copolymerization reaction of a conjugated vinyl compound and a conjugated diene compound or a halogen containing conjugated diene compound by the use of an organic aluminium halogenide containing a straight alkyl group such as ethyl or n-propyl results in formation of copolymers with high content of gel which is nearly 100% under certain polymerization conditions even when conducted in the presence of the above-mentioned activator, although the activator is effective upon the yield, rate of polymerization and activity of the catalyst. It is therefore impossible with the latter aluminium catalyst to produce commercially useful macromolecular materials with little gel content. As seen from the above descriptions the use of activator is advantageous in that the yield, the rate of polymerization and the activity of the catalyst are higher than in the absence of the same.

As the compounds used in the invention as activator may be mentioned: (a) water; (b) trihaloacetic acids such as trifluoroacetic acid, trichloroacetic acid and tribromoacetic acid; and esters thereof such as the methyl ester, ethyl ester and butyl ester; (c) organic compounds containing peroxide bond in general, such as diacyl peroxide, ketone peroxide, aldehyde peroxide, ether peroxide, hydroperoxide, dialkyl peroxide, diaryl peroxide, per acid esters, dialkyl percarbonate and diaryl peroxide including, for example, but not being limited to, benzoyl peroxide, lauroyl peroxide, capryl peroxide, 2,4-dichlorobenzoyl peroxide, 4 - nitrobenzoyl peroxide, 4-methoxybenzoyl peroxide, 4-chlorobenzoyl peroxide, acetyl peroxide, stearoyl peroxide, phthaloyl peroxide, methyl ethyl ketone peroxide, cyclohexanone peroxide, t-butyl hydroperoxide, p-methane hydroperoxide, diisopropylbenzene hydroperoxide, cumene hydroperoxide, d-t-butyl peroxide, di-cumyl peroxide, t-butyl cumyl peroxide, t-butyl perbenzoate, t-butyl perisobutyrate, t-butyl peracetate, t-butyl peroxypivalate, phenyl percarbamate, diisopropyl percarbonate and t-butyl perisopropyl carbonate; (d) organic azo compounds in general such as azobisnitrile, azobis substituted alkane, diazo thioether, and aryl azosulfone, including, for example, but not limiting to, azobisisobutyronitrile, azobis - α - methylbutyronitrile, azobis-α-ethylbutyronitrile, azobis - α-methylheptanonitrile, azobis-α-isobutyropropionitrile, phenylazotriphenylmethane and phenylazodiphenylmethane, (e) trialkylborons such as trimethylboron, triethylboron, tributylboron, trihexylboron, tricyclohexylboron and triphenylboron, (f) various metal acetylacetonates such as manganese triacetylacetonate, manganese diacetylacetonate, cobalt triacetylacetonate, cobalt diacetylacetonate, copper diacetylacetonate, chromium triacetylacetonate, aluminium triacetylacetonate, nickel acetylacetonate, iron triacetylacetonate, zirconium tetraacetylacetonate, zinc diacetylacetonate, titanyloxy diacetylacetonate, vanadyloxy diacetylacetonate, magnesium diacetylacetonate, vanadium triacetylacetonate and dioxymolybdenum diacetylacetonate.

These activators (a)–(f) may be used alone or in mixture of two or more compounds. The rate of the above-mentioned activator used per mole of the organic aluminium halogenide is (a) $1/1000$–$1/2$ mole, preferably $1/500$–$1/10$ mole of water, (b) $1/100$–1 mole, preferably $1/50$–$1/2$ mole of trihaloacetic acids or esters thereof, (c) $1/1000$–1 mole, preferably $1/5000$–$1/10$ mole of the organic peroxide, (d) $1/1000$–10 moles, preferably $1/100$–1 mole of the organic azo compound, (e) $1/1000$–1 mole, preferably $1/100$–$1/2$ mole of the trialkylboron, which is more preferably employed in the coexistence of about $1/100$–1 mole of oxygen per mole of the trialkylboron and (f) $1/100$–1 mole, preferably $1/50$–$1/2$ mole of the metal acetylacetonate. The use of the activator in an excessively small amount will not produce the desired results and conversely in an excessively large amount tends to cause undesired side reactions such as gel formation.

PREFERRED EMBODIMENTS OF THE INVENTION

This invention will be described in greater detail in conjunction with the following specific and referential examples.

Example 1

An autoclave 2 l. in inner volume equipped with a magnetic stirrer, thermometer and inlet for the reagent was purged with nitrogen and then, while chilling the autoclave to —70° C., charged with 200 ml. of n-heptane, 66 ml. (1 mole) of acrylonitrile and 87 ml. (1 mole) of butadiene. Then, while maintaining the inner temperature at 0° C., 200 ml. of an n-heptane solution of isobutylaluminium dichloride (1 mole l.) separately cooled to 0° C. where introduced under pressure into the autoclave and the mixture was subjected to polymerization at 0° C. for 6 hours.

After completion of the polymerization, the resulting polymer was treated with a methanol acidified with hydrochloric acid and containing 0.1% di-t-butyl-p-cresol. The polymer thus precipitated were separated by filtration and dried in vacuo to give 80 g. of a white rubbery polymer.

The polymer was soluble in chloroform and contains very little gels. Its nitrogen content was 13.2% and the value coincided with the theoretical content of nitrogen which was 13.1% for 1:1 ratio of butadiene to acrylonitrile contained. Reduced viscosity of the dimethylformamide solution was 2.5 as measured in a 0.5% solution at 25° C. Infrared absorption spectrum of the polymer was nearly identical with that of commercial nitrile rubber containing about half an amount of acrylonitrile, but NMR spectra of the two were apparently different, the absorption attributed to the butadiene-butadiene bond being recognized with the commercial nitrile rubber whereas not with the polymer. Thus, it was confirmed that the latter contained a very large proportion of the alternative structure of 1:1 butadiene-acrylonitrile. FIGS. 1 and 2 respectively indicates the infrared absorption and NMR spectra of the alternative polymer obtained in this example.

Referential Example 1

A copolymerization of butadiene and acrylonitrile was run under entirely the same conditions and using entirely the same procedures as in Example 1 except that ethylaluminium dichloride was used in place of the isobutylaluminium dichloride. There were obtained 90 g. of the polymer, which was insoluble in chloroform and nearly entirely a gelled product.

Referential Example 2

A copolymerization of butadiene and acrylonitrile was run under entirely the same conditions and using entirely the same procedures as in Example 1 except that n-butylaluminium chloride was used in place of the isobutylaluminium dichloride. There were obtained 87 g. of the polymer, which was, like in Referential Example 1, nearly entirely a gelled product.

Referential Example 3

A copolymerization of butadiene and acrylonitrile was run under entirely the same conditions and using entirely the same procedures as in Example 1 except that m-hexylaluminium dichloride was used in place of the isobutylaluminium dichloride. There were obtained 82 g. of the polymer, which was, like in Referential Example 1, nearly entirely a gelled product.

Referential Example 4

A copolymerization of butadiene and acrylonitrile was run under entirely the same conditions and using entirely the same procedures as in Example 1 except that ethylaluminium sesquichloride was used in place of the isobutylaluminium dichloride. There were obtained 85 g. of the polymer, which similarly contained a very large proportion of a gelled product.

Example 2

A copolymerization of butadiene and acrylonitrile was run under entirely the same conditions and using entirely the same procedures as in Example 1 except that an ethyl ether complex of isopropylaluminium dichloride was used in place of the isobutylaluminium dichloride. There were obtained 92 g. of a white rubbery polymer. The polymer was nearly soluble in chloroform and contained a very small portion of a gel. Its reduced viscosity in dimethylformamide solution was 2.1.

Referential Example 5

An autoclave 200 ml. in inner volume equipped with a magnetic stirrer, thermometer and inlet for the reagent was purged with nitrogen and then, while chilling the autoclave to −50° C., charged with 50 ml. of toluene, 66 ml. (0.1 mole) of acrylonitrile and 8.7 ml. (0.1 mole) of butadiene.

Then, while maintaining the inner temperature at 0° C., 10 ml. of a toluene solution of ethylaluminium dichloride (1 mole/l.) were introduced under pressure into the autoclave and the mixture was subjected to polymerization at 0° C. for 1 hour. There were resulted 2.5 g. of the polymer, which also contained a very large portion of a gelled product.

Referential Example 6

A copolymerization of butadiene and acrylonitrile was run at 0° C. for 2 hours under entirely the same conditions and using entirely the same procedures as in Referential Example 5 except that 2 millimoles of ethylaluminium dichloride were used. There were resulted 1.1 g. of the polymer, which also contained a very large proportion of a gelled product.

Example 3

A copolymerization of butadiene and acrylonitrile was run at −10° C. for 8 hours under entirely the same conditions and using entirely the same procedures as in Referential Example 5 except that 8.7 ml. (0.1 mole) of butadiene and 19.8 ml. (0.3 mole) of acrylonitrile, isobutylaluminium dichloride in place of the ethylaluminium dichloride and heptane as the solvent in place of the toluene were employed. There were obtained 3.3 g. of a white rubbery polymer, which was soluble in chloroform. Infrared absorption and NMR spectra of the polymer were entirely identical with those of the polymer in Example 1. It was apparent that the alternative polymer was produced with a modified ratio of monomer charge.

Example 4

A copolymerization was run at −20° C. for 10 hours under entirely the same conditions and using entirely the same procedures as in Example 3 except that 26.1 ml. (0.3 mole) of butadiene and 6.6 ml. (0.1 mole) of acrylonitrile were employed. There were resulted 2.8 g. of a white rubbery polymer, which was soluble in chloroform. Infrared absorption and NMR spectra of the polymer were entirely identical with those of the polymer in Example 1. It is apparent that the alternative polymer was produced with a modified ratio of monomer charge.

Referential Example 7

A copolymerization of butadiene and acrylonitrile was run at −20° C. for 10 hours under entirely the same conditions and using entirely the same procedures as in Referential Example 5 except that heptane was used as the solvent in place of the toluene. There were obtained 3.6 g. of the polymer, which was a gelled product.

Example 5

A copolymerization of butadiene and acrylonitrile was run at 5° C. under entirely the same conditions and using entirely the same procedures as in Example 1 except that 176 ml. (2 moles) of butadiene and 100 millimoles of isobutylaluminium chloride were used. There were obtained 43 g. of a soluble white rubbery polymer, which was soluble in chloroform.

Example 6

A copolymerization of butadiene and acrylonitrile was run at 5° C. under entirely the same conditions and using entirely the same procedures as in Example 1 except that 132 ml. (2 moles) of acrylonitrile and 100 millimoles of isobutylaluminium dichloride were used. There were obtained 36 g. of a soluble white rubbery polymer.

Example 7

A copolymerization of butadiene and methyl methacrylate was run at 0° C. for 3 hours under entirely the same conditions and using entirely the same procedures as in Example 1 except that 1 mole of methyl methacrylate was used in place of the acrylonitrile to give 36 g. of a white rubbery polymer. The polymer was nearly soluble in chloroform and its reduced viscosity in dimethylformamide solution was 2.4. The elementary analysis found to be C: 70.4% and H: 9.2% well coincides with the theoretical value for the 1:1 copolymer of butadiene and methyl methacrylate being C: 70.1% and H: 9.1%. It was confirmed also by its infrared absorption spectrum that the product was the copolymer. Formation of the 1:1 alternative copolymer was thus demonstrated as in the case of acrylonitrile.

Referential Example 8

A copolymerization of butadiene and methyl methacrylate was run under entirely the same conditions and using entirely the same procedures as in Example 7 except that ethylaluminium dichloride was used in place of the isobutylaluminium dichloride to give 38 g. of the polymer, which contained a large portion of a gelled product.

Example 8

An autoclave 1 l. in inner volume equipped with a magnetic stirrer, thermometer and inlet for the reagent was purged with nitrogen and then, while chilling the autoclave to −10° C., charged with 200 ml. of n-heptane, 26.4 ml. (0.4 mole) of acrylonitrile and 50 ml. (0.5 mole) of isoprene. Then, while maintaining the inner temperature at 0° C., a mixture of 50 millimoles of isobutylaluminium dichloride and 6.6 ml. (0.1 mole) of acrylonitrile was introduced under pressure into the autoclave, and the mixture was subjected to polymerization at 0° C. for 2 hours. After completion of the polymerization, the polymerized mass was treated by the same procedures as in Example 1 to give 5.5 g. of a white rubbery polymer. The polymer was soluble in chloroform and contained a little gel. Reduced viscosity of the dimethylformamide solution was 2.2. Nitrogen content of the polymer was 11.2% and well corresponded to the theoretical content of nitrogen being 11.5% for 1:1 ratio of isoprene to acrylonitrile contained. Thus, the polymer was found to be the alternative copolymer.

Referential Example 9

A copolymerization of isoprene and acrylonitrile was run under entirely the same conditions and using entirely the same procedures as in Example 8 except that ethylaluminium dichloride was used in place of the isobutylaluminium dichloride to give 12.1 g. of a gelled polymer.

Example 9

A copolymerization of chloroprene and acrylonitrile was run under entirely the same conditions and using entirely the same procedures as in Example 8 except that 46 ml. (0.5 mole) of chloroprene was used in place of the isoprene. There were obtained 8.3 g. of a rubbery polymer, which was soluble in chloroform.

Chlorine content of the polymer was 24.8%, which well corresponded to the theoretical content of chlorine with 1:1 content of acrylonitrile and chloroprene being 25.1% to indicate the alternative copolymer.

Referential Example 10

A copolymerization of chloroprene and acrylonitrile was run under entirely the same conditions and using entirely the same procedures as in Example 9 except that ethylaluminium dichloride was used in place of the isobutylaluminium dichloride to give 11.9% of a gelled polymer.

Example 10

A copolymerization was run under entirely the same conditions and using entirely the same procedures as in Example 2 except that methacrylonitrile was used as the monomer in place of the acrylonitrile. There were obtained 37 g. of a white polymer, which was soluble in chloroform. Nitrogen content of the polymer was 11.5%, which well corresponded to the theoretical content with 1:1 content of methacrylonitrile and butadiene to indicate the alternative copolymer.

Referential Example 11

A copolymerization of butadiene and methacrylonitrile was run under entirely the same conditions and using entirely the same procedures as in Example 10 except that ethylaluminium dichloride was used in place of the isobutylaluminium dichloride to give 40 g. of a gelled polymer.

Example 11

A copolymerization of butadiene and acrylonitrile was run under entirely the same conditions and using entirely the same procedures as in Referential Example 4 except that an equimolar mixture of ethylaluminium sesquichloride and isobutylaluminium dichloride was used in place of the ethylaluminium sesquichloride. There were obtained 84 g. of a white rubbery polymer, which was almost soluble in chloroform with a little gel. It was apparent that combined use of isobutylaluminium dichloride resulted in remarkably decreased formation of the gelled product as compared with Referential Example 4.

Example 12

A copolymerization of butadiene and methacrylonitrile was run under the same conditions and using the same procedures as in Example 10 except that an equimolar mixture of triisobutylaluminium and aluminium chloride was used in place of the isobutylaluminium dichloride. There were obtained 21 g. of a white polymer, which was soluble in chloroform with a little gelled product.

Example 13

A copolymerization was run under entirely the same conditions and using entirely the same procedures as in Example 1 except that a 7:3 molar mixture of isohexylaluminium dichloride and isobutylaluminium dichloride was used as the catalyst. There were obtained 76 g. of a white rubbery copolymer with a little gelled product.

Example 14

A copolymerization was run under entirely the same conditions and using entirely the same procedures as in Example 9 except that methacrylonitrile was used in place of the acrylonitrile and sec-butylaluminium dichloride in place of the isobutylaluminium dichloride. There were obtained 13.2 g. of a white polymer, elementary analysis of which indicated the alternative copolymer. The polymer contained a little portion of gel.

Referential Example 12

A copolymerization of chloroprene and methacrylonitrile was run under entirely the same conditions and using entirely the same procedures as in Example 14 except that ethylaluminium dichloride was used in place of the sec-butylaluminium dichloride. There were obtained 15.1 g. of a white polymer, which contained much gelled product.

Example 15

An autoclave 2 l. in inner volume equipped with a magnetic stirrer, thermometer and inlet for the reagent was purged with nitrogen and thereafter, while chilling the autoclave to −70° C., charged with 87 ml. of butadiene and 400 ml. of n-heptane. Separately, a solution (A) was prepared by thoroughly mixing 100 ml. of well dried acrylonitrile with 0.80 g. of distilled water. Into the autoclave were then added 1 ml. of the solution (A) and 65 ml. of the same dried acrylonitrile as above. While maintaining the inner temperature of the autoclave at 0° C., 100 ml. of an n-heptane solution of isobutylaluminium chloride (1 mole/l.) separately prepared and cooled to 0° C. were introduced under pressure into the autoclave. Polymerization was effected at 0° C. for 3 hours.

After completion of the polymerization the polymer was treated with methanolic hydrochloric acid containing 0.1% di-t-butyl-p-cresol and the polymer thus precipitated was separated by filtration and dried in vacuo to give 69.5 g. of a white rubbery polymer.

The polymer was soluble in chloroform and contained a little portion of gelled product. Nitrogen content of the polymer was 13.2%, which well corresponded to the theoretical content of nitrogen with 1:1 contents of butadiene and acrylonitrile being 13.1%. Reduced viscosity in dimethylformamide solution was 2.1 (0.5% solution at 25° C.). Infrared absorption spectrum of the polymer was almost identical with that of commercial nitrile rubber containing about a half portion of acrylonitrile, but apparent difference exists between the NMR spectra of the two in $CdCl_3$ solution. The absorption ascribed to butadiene-butadiene bonding was observed with the commercial nitrile rubber, whereas almost none with the polymer of this example, which was confirmed to contain very much alternative structure of 1:1 butadiene and acrylonitrile. FIGS. 1 and 2 respectively indicate infrared absorption and NMR spectra of the alternative copolymer produced in this example. The curve A in FIG. 2 is of the random copolymer produced by radical polymerization and the curve B is of the alternative copolymer according to this invention.

For comparison's sake, similar polymerization was conducted in the absence of water at 0° C. for 6 hours to give only 25.8 g. of the polymer formed. The results apparently indicated the activating effect of water. The nitrogen, butadiene, acrylonitrile and n-hexane were used in the above experiments following passage through a drying column filled with molecular sieve 3A and the isobutylaluminium dichloride was one purified from the commercial product by distillation under reduced pressure. The conditions of drying under which the present polymerization system is treated are in the order of "the drybox" or "the vacuum system" described by P. H. Pleasch in "The Chemistry of Cationic Polymerization," p. 684, 1963. The experiments in the following examples were made under similar anhydrous conditions.

Example 16

A copolymerization of butadiene and acrylonitrile was run under the same conditions and using the same procedures as in Example 15 except that 1.5 ml. of the solution (A) and 64.5 ml. of acrylonitrile were used as the acrylonitrile component. There were obtained 76.3 g. of the polymer and indicated the activating effect of water.

Example 17

An autoclave 2 l. inner volume equipped with a magnetic stirrer, thermometer and inlet for the reagent was purged with nitrogen and thereafter, while chilling the autoclave to −70° C., charged with 87 ml. of butadiene and 200 ml. of n-heptane. A solution of 6.56 g. of azobisisobutyronitrile in 66 ml. of acrylonitrile was separately prepared by sufficient stirring and added into the autoclave, followed by keeping the inner temperature at 0° C. Then, 80 ml. of n-heptane solution of isobutylaluminium dichloride (1 mole/l.) separately prepared and cooled to 0° C. were introduced under pressure into the autoclave, followed by polymerization at 0° C. for 5 hours. The same treatment as in Example 15 yielded 64.2 g. of the polymer which contained a trace of gelled product. For comparison's sake, a similar polymerization was conducted in the absence of azobisisobutyronitrile to obtain 18.6 g. of the polymer.

Example 18

A copolymerization of acrylonitrile and butadiene was run under entirely the same conditions and using entirely the same procedures as in Example 17 except that 0.155 g. of benzoyl peroxide were used in place of the azobisisobutyronitrile. There were obtained 80.2 g. of white rubbery polymer, which contained a little gel.

Example 19

A copolymerization of butadiene and acrylonitrile was run under entirely the same conditions and using entirely the same procedures as in Example 17 except that 1.31 g. of trichloroacetic acid were used in place of the azobisisobutyronitrile. There were obtained 39.4 g. of a white rubbery polymer, which contained a very little gel.

Example 20

A copolymerization of butadiene and acrylonitrile was run under entirely the same conditions and using entirely the same procedures as in Example 15 except that 5.45 g. of tri-n-butylboron were used in place of the water. There were obtained 60.9 g. of a similar white rubbery cooplymer.

Example 21

An autoclave 1 l. in inner volume equipped with a magnetic stirrer, thermometer and inlet for the reagent was purged with nitrogen and thereafter, while chilling the autoclave to −20° C., charged with 200 ml. of n-heptane, 33 ml. of acrylonitrile, 44 ml. of butadiene, and 2.46 g. of azobisisobutyronitrile. Then, while maintaining the inner temperature at 10° C., an n-heptane solution of isopropylaluminium dichloride (1 mole/l.) separately prepared and cooled to 10° C. was added, followed by polymerization at 0° C. for 5 hours. There were obtained 34.1 g. of a similar white rubbery polymer, which contained a trace of gel.

For comparison's sake, a polymerization was run in the same way in the absence of azobisisobutyronitrile at 0° C. for 7 hours to give 10.7 g. of a white rubbery polymer. The results indicated the activating effect of azobisisobutyronitrile.

Example 22

A copolymerization of butadiene and acrylonitrile was run under entirely the same conditions and using entirely the same procedures as in Example 21 except that 4.55 g. of tri-n-butylboron were used in place of the azobisisobutyronitrile to give 29.8 g. of a rubbery copolymer. The polymerization under entirely the same conditions except that no azobisisobutyronitrile was used and the gas-phase portion inside the autoclave was purged with dry air followed by addition of tri-n-butylboron yielded 33.6 g. of a rubbery polymer.

Example 23

An autoclave 2 l. in inner volume equipped with a magnetic stirrer, thermometer and inlet for the reagent was purged with nitrogen and thereafter, while chilling the autoclave to −40° C., charged with 100 ml. of isoprene, 64.8 ml. of acrylonitrile, 1.2 ml. of the solution (A) prepared in Example 15 and 200 ml. of n-heptane. Then, while maintaining the inner temperature of the autoclave at 10° C., an n-heptane solution of isobutylaluminium dichloride (1 mole/l.) separately prepared and cooled to 10° C. was introduced under pressure, followed by polymerization at 10° C. for 6 hours. There were obtained 42.8 g. of a rubbery copolymer, which was confirmed by means of infrared absorption spectrum to be a copolymer of isoprene and acrylonitrile. Elementary analysis indicated a 1:1 composition, which allowed the copolymer to be considered as an alternative one similar to the butadiene-acrylonitrile copolymer. For comparison's sake, a copolymerization was run in the absence of the solution (A) and using 132 ml. of acrylonitrile to give 13.5 g. of a rubbery copolymer. The results indicated the activating effect of water.

Example 24

A copolymerization of isoprene and acrylonitrile was run under entirely the same conditions and using entirely the same procedures as in Example 23 except that the solution (A) was not used and 132 ml. of acrylonitrile and 0.91 g. of tri-n-butylboron were used. There were obtained 39.3 g. of the copolymer, which contained a trace of gel.

Example 25

A copolymerization was run in the same way as in Example 22 using 1.92 g. of ethyl trichloroacetate in place of the tri-n-butylboron to give 26.8 g. of the copolymer.

Example 26

A copolymerization was run at −5° C. for 5 hours under entirely the same conditions and using entirely the same procedures as in Example 17 except that methacrylonitrile was used in place of the acrylonitrile and chloroprene in place of the butadiene. There were obtained 58.9 g. of the polymer, which contained a trace of gel. Infrared absorption spectrum of the polymer confirmed it to be a copolymer of chloroprene and methacrylonitrile. Elementary analysis indicated a 1:1 composition, which allowed the copolymer to be considered as an alternative chloroprene-methacrylonitrile copolymer. For comparison's sake, the above polymerization was repeated at −5° C. for 8 hours in the absence of azobisisobutyronitrile. There were obtained only 27.2 g. of the copolymer.

Example 27

A copolymerization of isoprene and methyl methacrylate was run at 0° C. for 4 hours under entirely the same conditions and using entirely the same procedures as in Example 17 except that 100 ml. of isoprene were used in place of the butadiene, 105 ml. of methyl methacrylate in place of the acrylonitrile, 0.194 g. of di-tertiary-butyl peroxide in place of the azobisisobutyronitrile and sec-butylaluminium dichloride in place of the isobutylaluminium dichloride. There were obtained 61.3 g. of the polymer, which contained a very little gel. Infrared absorption spectrum of the polymer confirmed it to be a copolymer of isoprene and methyl methacrylate, and the elementary analytical values well coincided with the calculated values for the 1:1 alternative copolymer. For comparison's sake, the above polymerization was repeated at 0° C. for 6 hours in the absence of benzoyl peroxide to give only 18.3 g. of the copolymer.

Example 28

A copolymerization of isoprene and MMA was run under entirely the same conditions and using entirely the same procedures as in Example 27 except that 4.36 g. of tri-n-butylboron were used in place of the di-tertiary butyl peroxide to give 42.9 g. of the copolymer.

Example 29

A copolymerization of butadiene and acrylonitrile was run at 0° C. for 4 hours under entirely the same conditions and using entirely the same procedures as in Example 15 except that 1 ml. of the solution (A) and 65 ml. of acrylonitrile were used as the acrylonitrile component, and an equimolar mixture of aluminium chloride and triisobutylaluminium in place of the isobutylaluminium dichloride as the catalyst component to give 19.5 g. of a white rubbery copolymer. For comparison's sake, a copolymerization was run at 0° C. for 6 hours in the absence of the solution (A) to give only 8.7 g. of the polymer.

Example 30

A copolymerization was run at 0° C. for 4 hours under entirely the same conditions and using entirely the same procedures as in Example 17 except that 1.31 g. of azobisisobutyronitrile were used and an equimolar mixture of aluminium chloride and tributylaluminium as the catalyst in place of the isobutylaluminium dichloride. There were obtained 22.3 g. of the copolymer, which contained a trace of gel.

Example 31

A copolymerization was run at 0° C. for 3 hours under the same conditions and using the same procedures as in Example 15 except that 174 ml. of butadiene were used, 1.5 ml. of the solution (A) and 64.5 ml. of acrylonitrile as the acrylonitrile component and an equimolar mixture of ethylaluminium sesquichloride and isobutylaluminium dichloride as the catalyst to give 53.8 g. of the polymer. For comparison's sake, the above polymerization was repeated at −10° C. for 5 hours in the absence of the solution (A) and using 66 ml. of acrylonitrile as the acrylonitrile to obtain only 25.6 g. of the polymer.

Example 32

A copolymerization was run under entirely the same conditions and using entirely the same procedures as in Example 22 except that 0.49 g. of triethylboron were used in place of the tri-nbutylboron and a 7:3 molar mixture of isobutylaluminium dichloride and isohexylaluminium dichloride in place of the ether complex of isopropylaluminium dichloride to give 34.1 g. of the polymer. Similarly, the copolymerization was repeated by purging the gas-phase portion within the autoclave with dry air followed by addition of the triethylboron and using a 7:3 molar mixture of isobutylaluminium dichloride and isohexylaluminium dichloride to give 41.3 g. of the polymer. For comparison's sake, the above copolymerization was repeated in the absence of triethylboronoxygen to give only 17.5 g. of the polymer.

Example 33

A copolymerization was run under entirely the same conditions and using entirely the same procedures as in Example 17 except that 2.82 g. of manganese triacetylacetonate were used in place of the azobisisobutyronitrile to give 43.5 g. of the rubbery copolymer.

Example 34

A copolymerization was run in the same way as in Example 17 using 1.05 g. of zinc diacetylacetonate in place of the manganese triacetylacetonate to give 41.2 g. of the rubbery copolymer.

We claim:

1. Method for producing copolymers of a conjugated diene and a conjugated vinyl compound which comprises contacting (A) a conjugated diene and (B) a conjugated vinyl compound having the general formula

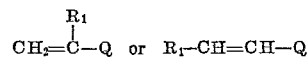

wherein $R_1$ is hydrogen, non-polymerizable hydrocarbon or halogenated hydrocarbon radical containing from 1–20 carbon atoms and Q is a nitrile radical or the group

in which Y is a radical selected from the group consisting of ZN, ZR, ZMe, NR'R", halogens and hydrogen, Z being oxygen or sulfur atom, R being a hydrocarbon radical containing from 1 to 20 carbon atoms, R' and R" being the same or different hydrocarbon radicals containing up to six carbon atoms or morpholino, pyrrollidino, or piperidino radicals, and Me is an element belonging to Groups I–III of the Periodic Table of the Elements indicated in terms of monovalency or ammonium radical in the presence of a catalytic quantity of an organic aluminium halogenide having the general formula $AlR_{3-n}X_n$ wherein $n$ is an arbitrary number of the value $1 \leq n < 3$, X is a halogen and R is a branched aliphatic hydrocarbon radical containing from 3 to 6 carbon atoms; and an activator selected from the group consisting of, (a) water, (b) trihaloacetic acid and alkyl esters thereof wherein the alkyl group contains up to four carbon atoms (c) organic azo compounds, and (d) metal acetylacetonates.

2. Method according to claim 1 wherein said conjugated diene is selected from the group consisting of butadiene-1,3, 2-bromo-butadiene-1,3, 2-chloro-1-methyl-butadiene-1,3, chloroprene, 2,3-dichloro-butadiene-1,3, 2,3-dimethyl-butadiene-1,3, 2-ethyl-butadiene-1,3, 1 - ethyl - 2-chloro-butadiene-1,3, isoprene, 1,3-pentadiene, 1-phenyl-butadiene-1,3, and 1,2,3-trichloro-butadiene-1,3.

3. Method according to claim 1 wherein said conjugated vinyl compound is selected from the group consisting of acrylonitrile, methacrylonitrile, crotonitrile, α-ethylacrylonitrile, α-cyclohexylacrylonitrile, α-crotoacrylonitrile, α-chloromethylacrylonitrile, methyl acrylate, ethyl acrylate, butyl acrylate, phenyl acrylate, methyl methacrylate, ethyl methacrylate, butyl methacrylate, phenyl methacrylate, methyl crotonate, ethyl crotonate, butyl crotonate, phenyl crotonate, acrylamide, methacrylamide, crotonamide, N-ethyl-acrylamide, N-ethylmethacrylamide, N-ethylcrotonamide, acrylic chloride, acrylic bromide, methacrylic chloride, methacrylic bromide, crotonic chloride, crotonic bromide, acrylic acid, methacrylic acid, crotonic acid, sodium acrylate, sodium methacrylate, sodium crotonate, acrolein, methacrolein, crotonaldehyde, methyl vinyl ketone, ethyl vinyl ketone, butyl vinyl ketone, and phenyl vinyl ketone.

4. Method according to claim 1 wherein said organic aluminium halogenide being selected from the group consisting of isopropylaluminium dichloride,
isopropylaluminium dibromide,
diisopropylaluminium chloride,
diisopropylaluminium bromide,
isobutylaluminium dichloride,
isobutylaluminium dibromide,
diisobutyl-aluminium chloride,
diisobutylaluminium bromide,
sec-butylaluminium dichloride,
sec-butylaluminium dibromide,
di-sec-butylaluminium chloride,
di-sec-butylaluminium bromide,
isopentylaluminium dichloride,
isopentylaluminium dibromide,
diisopentylaluminium chloride,
diisopentylaluminium bromide,
isohexylaluminium dichloride,
isohexylaluminium dibromide, diisohexylaluminium chloride,
diisohexyl-aluminium bromide, and mixtures thereof with aluminium trichloride or aluminium tribromide.

5. Method according to claim 1 wherein said metal acetylacetonate is selected from the group consisting of manganese triacetylacetonate,
manganese diacetylacetonate,
cobalt triacetylacetonate,
cobalt diacetylacetonate,
copper diacetylacetonate,
chromium triacetylacetonate,
aluminium triacetylacetonate,
nickel acetylacetonate,
iron triacetylacetonate,
zirconium tetraacetylacetonate,
zinc diacetylacetonate,
titanyloxy diacetylacetonate,
vanadyloxy diacetylacetonate,
magnesium diacetylacetonate,
vanadium triacetylacetonate,
dioxymolybdenum diacetylacetonate, and mixtures thereof.

References Cited
UNITED STATES PATENTS

| | | | |
|---|---|---|---|
| 3,127,380 | 3/1964 | Welch | 260—85.5 |
| 3,159,607 | 12/1964 | D'Alelio | 260—82.1 |
| 3,169,079 | 2/1965 | Ferrington et al. | 117—124 |
| 3,183,217 | 5/1965 | Serniuk | 260—85.5 |
| 3,326,870 | 6/1967 | Nakaguchi et al. | 260—85.5 |
| 3,492,277 | 1/1970 | Clark | 260—81.1 |
| 3,647,753 | 3/1972 | Nakaguchi et al. | 260—63 R |

WILLIAM H. SHORT, Primary Examiner

L. L. LEE, Assistant Examiner

U.S. Cl. X.R.

260—63 HA, 73 R, 82.1, 82.3, 83.5